United States Patent [19]

Baker

[11] 3,728,536
[45] Apr. 17, 1973

[54] PHOTOGRAPHIC LIGHTING UNIT
[75] Inventor: Philip G. Baker, Peabody, Mass.
[73] Assignee: Polaroid Corporation, Cambridge, Mass.
[22] Filed: May 20, 1971
[21] Appl. No.: 145,268

[52] U.S. Cl.....................240/1.3, 240/2 C, 240/36
[51] Int. Cl..............................................G03b 15/02
[58] Field of Search......................240/1.3, 2 C, 36, 240/81 C, 92; 95/11 R, 11 L

[56] References Cited

UNITED STATES PATENTS

| 3,603,781 | 9/1971 | Kobayashi et al. | 240/1.3 |
| 2,694,138 | 11/1954 | Schwinn | 240/36 X |
| 3,307,462 | 3/1967 | Hutchison et al. | 95/11 L |
| 3,113,495 | 12/1963 | Brandt et al. | 240/1.3 X |
| 3,177,354 | 4/1965 | Appleton | 240/1.3 X |

FOREIGN PATENTS OR APPLICATIONS

| 1,208,960 | 10/1970 | Great Britain | 240/1.3 |

Primary Examiner—Samuel S. Matthews
Assistant Examiner—Fred L. Braun
Attorney—Brown and Mikulka, Robert L. Berger and David R. Thornton

[57] ABSTRACT

A lighting unit, particularly adapted for use in motion picture photography, employing a reflector element and a screen-like lens displaceably mounted for movement between a storage position overlying and in close proximity to the source of illumination and an operable position spaced from the source. The reflector element and the lens are pivotally mounted on a platform-like base, which is adapted to receive an incandescent lamp, for pivotal motion from a first position overlying and in close proximity to the platform to a second position wherein at least a major portion of both are spaced from the platform so as to provide a suitable optical path between the source and the lens. A switch, mounted on the platform for engagement by the lens when it is in its closed position, is adapted to interrupt the electrical circuit and thereby prevent energization of the source of illumination when the unit is in its stored condition.

16 Claims, 3 Drawing Figures

INVENTOR
PHILIP G. BAKER
BY Brown and Mikulka
and
David R. Thornton

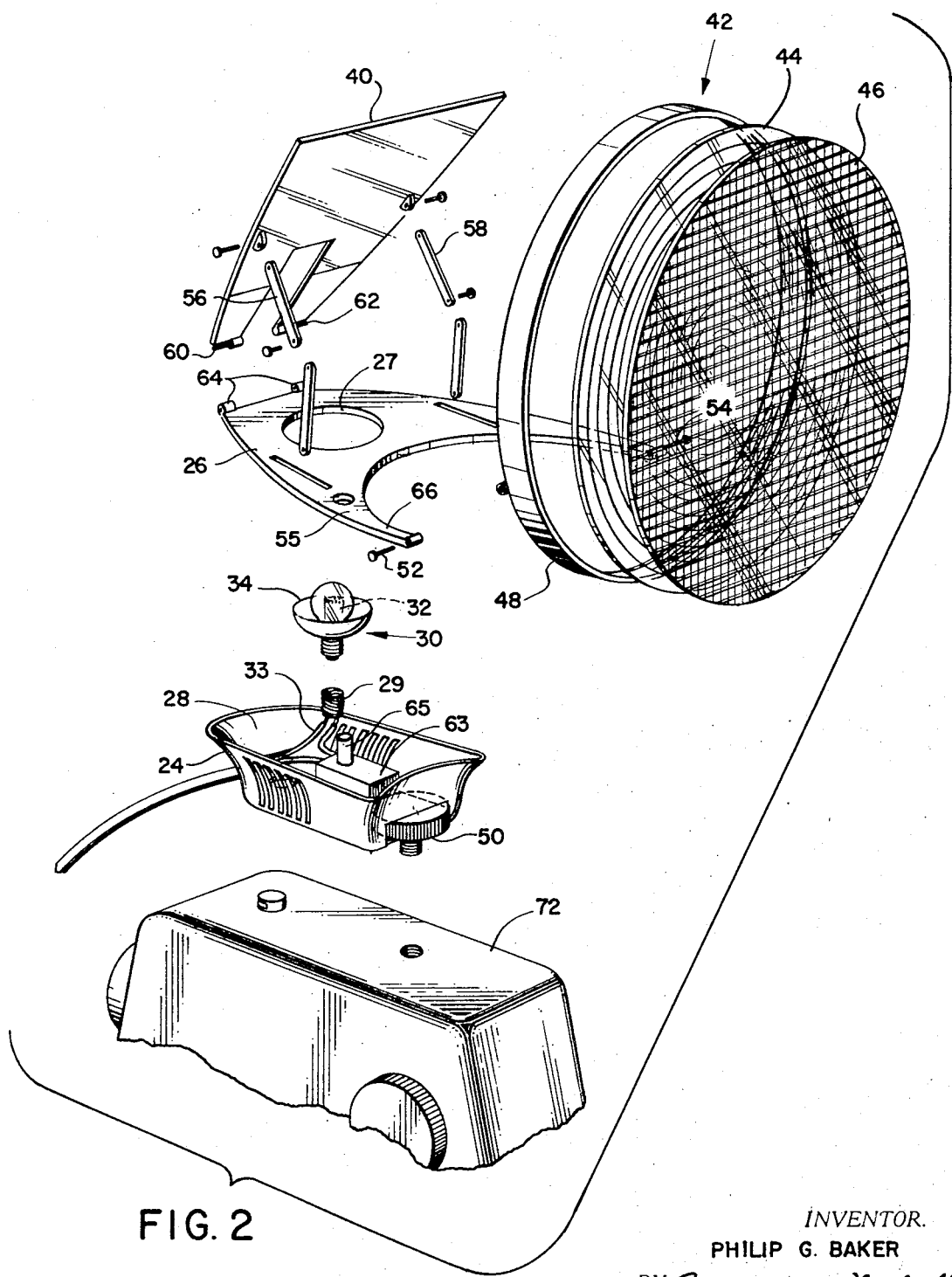

3,728,536

PHOTOGRAPHIC LIGHTING UNIT

BACKGROUND OF THE INVENTION

1. Field of the Invention

This invention relates to photographic lighting apparatus and more particularly to a portable photographic lighting unit for illumination of a subject during photographic exposure operations.

2. Description of the Prior Art

The high level of scene illumination necessary for photographic exposure operations, and the relatively continuous illumination required for motion picture photography which typically results in severe ophthalmic discomfort to the subject, may be alleviated by employing a lighting unit having a relatively large exit aperture. Importantly, the lighting unit should be a fully portable device, preferably designed for mounting on a camera apparatus. A suitable luminaire of this type is described in copending patent application Ser. No. 145,267 of Stewart Bennett, filed May 20, 1971 entitled "Photographic Motion Picture Apparatus" and assigned to the same assignee as the present invention. In this copending application, the lighting unit includes a screen-like lens which efficiently produces uniform scene illumination while presenting a source of apparently low brightness to the subject.

Inasmuch as lighting units of this type are intended for mounting on a camera, which is designed for operation under both daylight and artificial lighting conditions, it is desirable to provide a collapsible arrangement for compact storage of the lighting unit when not in use. Moreover, since the source of illumination generally produces thermal radiation, which can provide a fire hazard under appropriate conditions, it is also desirable to prevent inadvertent operation of the unit.

Consequently, it is an important object of this invention to provide an improved photographic lighting unit.

Another primary object of this invention is to provide a photographic lighting unit adapted for displacement of its elements to a compact storage arrangement.

Still another object is to provide a lighting unit which is rendered inoperable when it is in a stored condition.

A further object of this invention is to provide a lighting unit of relatively large exit aperture adapted for arrangement of its elements between a compact, storage position and an erected, operative position.

SUMMARY OF THE INVENTION

The present invention provides photographic lighting apparatus for use with a motion picture camera for illumination of a scene during exposure operations and comprises means for mounting a source of illumination, means for directing the illumination from the source towards the scene to be photographed, and means for alternately arranging the mounting means and directing means between an operative position wherein the directing means is spaced from the mounting means and a storage position wherein the directing means is disposed in relatively close proximity to the mounting means.

Means are additionally provided for automatically precluding electrical energization of the device except when the light directing elements are disposed in their operative position. More specifically, the unit includes conductor means for providing electrical communication between the source of illumination and a source electrical power, which is actuated in response to positioning of the directing means in its operative location.

Preferably, the lighting unit includes a platformlike base member, adapted to receive a high intensity lamp which integrally includes means for concentrating or directing the lamp's illumination along a given path substantially normal to the platform surface. A mirror and lens element are pivotally mounted to the platform base for displacement between a storage position overlying the platform and an operative position wherein they are erected over the platform. In its operative position, the mirror is inclined over the lamp and redirects the illumination in a path substantially parallel to the platform and along the optical axis of the lens element which, in its operative position, is located substantially normal to the platform.

Additionally, a switch, mounted on the platform in position for engagement by the lens element when the latter is in its storage position, is adapted to disrupt the electrical circuit and prevent lamp operation when the unit is not in use.

BRIEF DESCRIPTION OF THE DRAWINGS

The novel features that are considered characteristic of the invention are set forth with particularity in the appended claims. The invention itself, however, both to as its organization and its method of operation, together with additional objects and advantages thereof, will best be understood from the following description of the preferred embodiment when read in connection with the accompanying drawings wherein like numbers have been employed in the different figures to denote the same parts and wherein;

FIG. 2 is an exploded view in perspective of the lighting unit shown in FIG. 1.

DESCRIPTION OF THE PREFERRED EMBODIMENT

Figure 1:
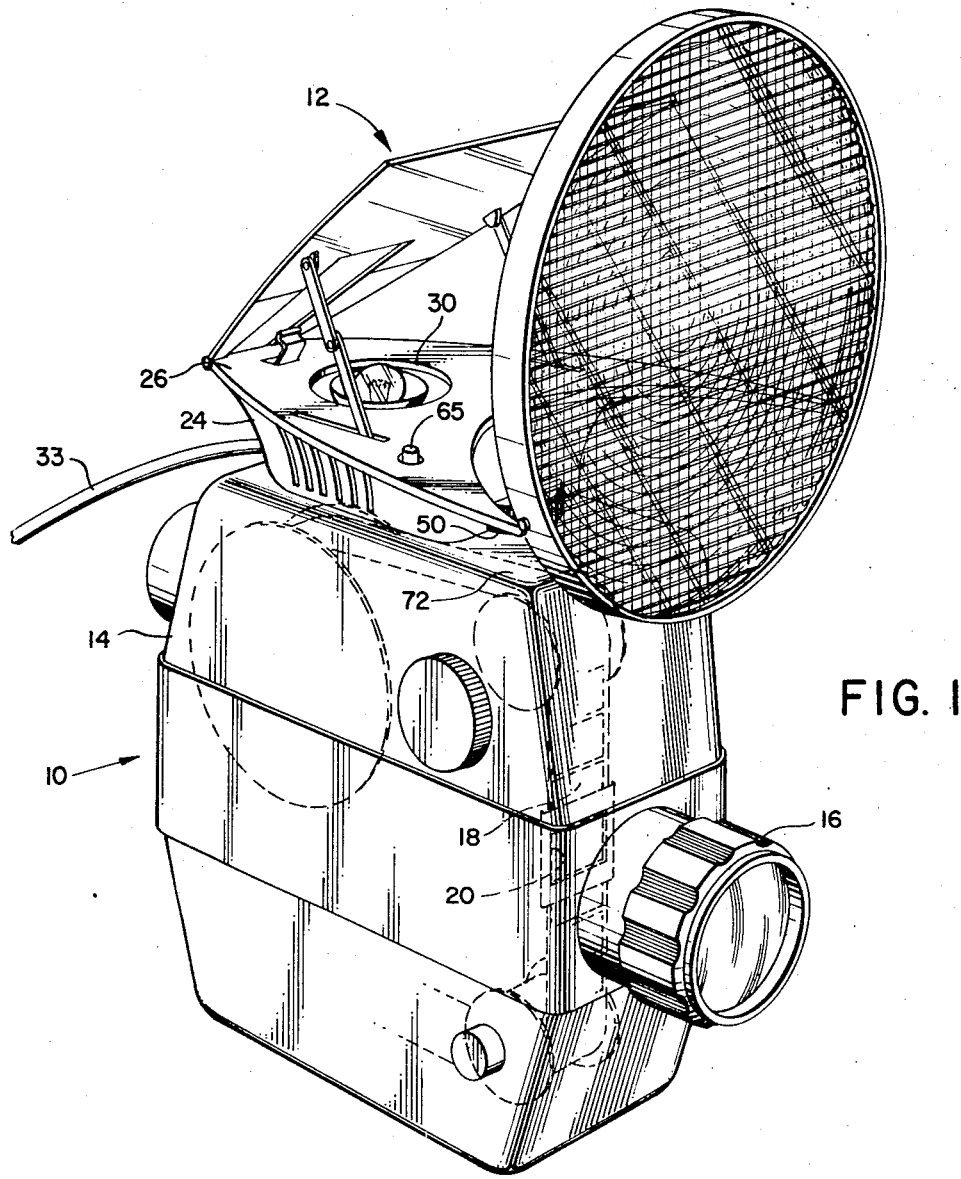
FIG. 1 is a diagrammatic view in perspective of photographic apparatus employing a lighting unit embodying features of this invention.

In FIGS. 1 and 2, a conventional motion picture camera 10 is shown in association with a lighting unit 12. The camera 10 comprises a substantially light-tight housing 14 having a forwardly positioned objective lens system 16 adapted for exposure of a motion picture film 18 when it is positioned within the housing at an exposure aperture 20. The lighting unit 12, as shown more clearly in FIG. 2, comprises a container-like base or support structure 24 having an upper platform-like surface 26 which includes an opening 27 in communication with the interior 28 of the base. An electrical socket 29 is disposed within base 24 beneath opening 27 and is adapted for mounting of a high intensity illuminating means 30 and for energizing the same by connection through leads 33, to a conventional source (not shown) of electrical power. Hence, socket 29 provides means for mounting a source of illumination whereas leads 33 provide means for communicating or coupling the socket to a source of electrical power.

In this embodiment, the socket 29 is designed to receive an illuminating means or lamp 30 which integrally combines a source 32 of illumination and a dichroic reflector 34; for example, a Tungsten-Halogen lamp having an outer elliptical, dichroic reflector element which transmits a major portion of the infrared radiation while it reflects and focuses a major portion of the visible radiation to a point (not shown) a short distance forward of the source. Hence, a lamp similar to the DNF Halogen lamp 150 QTB/LVD marketed by the Photolamp Products Division, Sylvania Electric Products, Incorporated of Salem Mass. will be suitable. Alternately, the illumination system may take the form of more traditional types such as those wherein the focal point of the reflector is at the lamp itself and a lens positioned in front of the lamp focuses a converging beam of light to a particular focal point. In this case, the lighting unit 12 is constructed such that the major portion of the visible radiation is directed upwardly to a reflector element 40, such as a polished aluminum mirror, which, in turn, redirects it in a path substantially parallel with the platform surface 26 and through a vertically positioned lens assembly 42.

As described in the aforementioned copending patent application, lens assembly 42 provides means for directing or dispersing the visible radiation over a precisely controlled solid angle and for presenting an apparent source of comparatively low brightness to the subject. Hence, lens assembly 42 includes a rear lens element 44 closely spaced from a forwardly positioned lens element 46 within a circumferential support member 48. For instance in one arrangement and by way of example, the lens element 44 is spaced three-sixteenths inch from the screen-like lens 46. The rearward lens 44 is a circular Fresnel lens which is adapted to collimate radiation from source 30 and direct it in substantially parallel rays through the forward element 46, and the latter is a crossed-lenticular lens which uniformly disperses the collimated radiation over a precise solid angle.

That is, the lens 46 includes a plurality of crossed lenticules (not shown) which are disposed in horizontal and vertical planes, respectively, so that, together, they disperse the transmitted light over a solid angle whose sides form horizontal and vertical planes. Stated otherwise, each crossed portion of the lenticules substantially function as individual lens elements which disperse the light over the indicated solid angle of illumination. Hence, the lens 46 also provides a lenticular array of large area which presents a mosaic of light sources to the subject and thereby provides means for presenting a collective source of apparently low brightness.

Preferably, the lenticular screen 46 is designed to transmit a solid angle of illumination substantially conforming to the camera viewing angle which is, in turn, determined by its lens system 16 in combination with exposure aperture 20. In this embodiment, lens system 16 is a conventional lens system of variable focus, and screen 46 is configured to provide an angle of illumination conforming to the widest or maximum viewing angle of the camera which is, in turn, determined by the minimum focal length of the camera lens system. Since one of the purposes of the novel lighting unit is to provide maximum efficiency of illumination, the solid angle of illumination should preferably, substantially conform to, or that is, be on the order of and not less than the maximum viewing angle. For instance, with a camera having a wide viewing angle of 14° by 18°, the solid angle of illumination should preferably be within 14° to 14½° by 18° to 18½°. Preferably, the lenticular lens 46 is oriented with respect to the camera 10 such that the rectangular cross-section of the angle of illumination and that of the viewing angle of the camera have a corresponding attitude. Hence, when the lighting unit 12 is mounted to the camera, for example, by a conventional lug member 50, so as to direct the optical axis $\alpha$ of the solid angle (not shown) of illumination along the direction of and converging at a slight angle to the axis $\beta$ of the viewing angle (not shown) for interception with the latter, the lighting unit will illuminate a rectangular area (not shown) which is substantially congruant to the scene area viewed by the camera. For proper illumination, the angle of inclination $\theta$ of the lighting unit or that is, the angle between the lamp projection axis $\alpha$ and the lens axis $\beta$ is determined in accordance with the object distance of the camera system so as to provide interception at this distance. For example, in a typical case where the axis of the screen is spaced approximately 5 inches above the camera lens and the average object distance is 7 feet, $\theta$ would be in the order of 3½°.

Advantageously, while a typical amateur movie light of 650 watts input produces approximately 300 lumens per sq. cm. of visible radiation (and additional hazardous amounts of infrared) at its exit aperture, the present structure employing a lenticulated screen of 7 inch diameter and utilizing a 200 watt bulb will emit approximately 20 lumens per sq. cm. of solely visible radiation at the screen exterior. Moreover, since the screen 46 is of large diameter relative to the lamp 30 and in accordance with its lenticulated form provides a multiplicity of source images of substantially equal apparent brightness to the observer. Hence, while a small diameter lamp (e.g. of 1 inch reflector diameter) is employed, which provides a relatively compact structure, the large area (e.g. approximately 50 square inches) lenticular screen presents a source of apparently low brightness to the subject. Additionally, if the lenticules are chosen fine enough (e.g. over 50 per inch and preferably 100 per inch) such that they cannot be resolved by the subject at a suitable distance, such as a few feet from the screen, the source images are unresolved and the screen presents a diffused source of apparently low brightness while still maintaining the precise solid angle of illumination.

Brightness is, of course, related to the sensory perception of light and standing alone, is somewhat nonquantitative; however, it generally can be considered as a function of the visible light flux per unit area, per unit angle. In any case, for a given observer located at a given point relative to a source which produces given lumens per radian, it can be seen that the apparent brightness will be related to the source area. Stated otherwise, the comparative brightness of two sources directing the same amount of light energy over equal solid angles will be substantially equal to the ratio of their areas.

Consequently, while a high intensity bulb of the aforementioned type, when viewed directly, provides an effective source area of approximately 0.8 square inch (approximate area of the 1 inch reflector opening), the 7 inch screen has an area of approximately 50 square inches. Hence, in the given example, the lighting unit provides a ratio of the area of the perceived source to the area of the effective source in the order of 60:1 and results in a reduction in apparent brightness of approximately the same magnitude. Ratios greater than 10:1 are preferred, however, it should be evident that while the apparent brightness perceived by the subject will be higher for units of small screen area, in accordance with the reduction in the ratio of screen to source area, the screen presents a uniformly illuminated area to the observer, and hence, the apparent brightness of the novel unit will in all cases be significantly lower than prior art units having the same size exit aperture which typically present to the subject a "hot spot", representative of the small area of the actual source of illumination.

A folded optical path, previously described, is employed to make the lighting unit 12 more compact. Further, efficiency is insured by positioning lens assembly 42 so as to intercept substantially all of the visible radiation focused by dichroic reflector 34. Hence, Fresnel lens 44 having a given focal length, of, for example, 8 inches, is spaced along the optical path from the focal point (not shown) of illuminating means 30, a distance approximately equal to its given focal length. Consequently, the visible radiation diverging from the crossover forward of the lamp 30 is intercepted by lens 44 and directed in parallel rays to the forward positioned lens 46.

As described in the aforementioned copending application, lens 46 provides a light dispersing means and is of relatively large diameter (e.g. approximately 7 inches in diameter) compared to the diameter of lamp 30 (e.g. 1 inch in diameter) so as to compactly provide a lighting unit of large exit aperture and present a source of apparently low brightness to the subject. Advantageously, the collimating means lens 44, which is generally approximately equal to the diameter of the final screen-like lens 46, is closely spaced to the latter and results in a compact lens assembly 42 mounted at a given optical distance forward of the relatively small diameter lamp 30 so as to provide a lighting unit having a pleasing and efficient form factor; wherein the light directing elements of large area are conventionally grouped together.

The novel structure is adapted for positioning the various elements relative to one another so as to provide means for alternately arranging the elements in an operative position or in a compact storage position. Hence, the unit provides means for displacing the lens assembly 42 relative to the base 24 between a first position (see FIG. 1), where the screen is operatively spaced from source 30, and a storage position (see FIG. 3), where the screen is disposed in close proximity to the source 30. In the preferred embodiment, this is accomplished by providing means for pivoting the lens assembly 42 between an erect position where it is normal to platform 26 and a second position overlying the platform.

Figure 3:
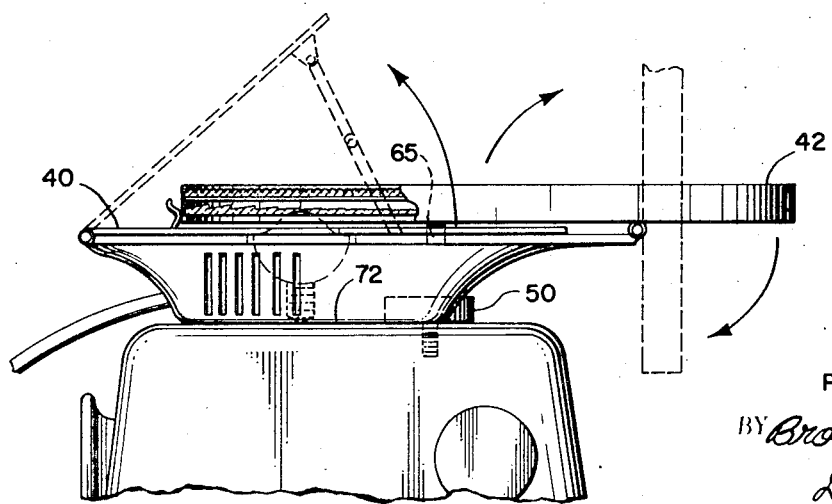
FIG. 3 is a fragmentary view in elevation illustrating the foldable operation of the lighting unit.

Preferably, the lens assembly 42 is pivotally mounted on the platform 26, for example, by means of pivot shafts 52 and 54 which couple the lens frame 48 to the forward end 55 of the platform, such that the lens may be pivotally displaced between its upright position and a position substantially parallel to the platform and in close proximity to the source 30, as shown in FIG. 3. The pivot shafts 52 and 54 include indents (not shown) which retain the lens assembly 42 in either of the two positions. Other means of properly positioning the lens in either of the two positions may also be employed. For example, a conventional latch arrangement (not shown) configured to hold the lens in its stored position may be utilized in conjunction with a spring (not shown) for automatically erecting and positioning the lens in the vertical plane upon release of the latch.

Advantageously, mirror 40 is also displaceably coupled to platform 26 through a pair of foldable struts 56 and 58 which permit its pivotal displacement between an operative position, where it's inclined over the source 30 as shown in FIG. 1 and a storage position overlying the platform 26, as shown in FIG. 3. In this case, proper location of mirror 40 in its operative position in insured by depending arm-like portions 60 and 62 which engage the rear edge 64 of the platform when the mirror is in its operative position. Inasmuch as the source 30 is designed to project slightly above the platform 26, mirror 40 is cut away or bifurcated at its rearward edge so as to permit the source to extend slightly through the mirror when the latter is in its stored position.

Advantageously, the unit also includes means for precluding energization of the source 30 when the unit is in its stored condition. Consequently, the structure eliminates the potential fire hazard of inadvertent operation at this time, which is particularly important for battery operated units since these are often stored in conjunction with their power source. Additionally, since the lens 46 is not in its proper operative position when stored, it may fail to function as a source of low apparent brightness, and hence permit ophthalmic discomfort of a viewer if the lighting unit were energized at this time.

In this regard, mounted on the platform 26, is a switch 63 such as a conventional microswitch having an actuating arm 65 extending upwardly from the platform for engagement with the lens assembly 42 (or mirror 40) when it is in its stored position. The switch 63 is a "normally-closed" switch adapted for actuation to an open circuit mode responsive to depression of its arm 65. The switch 63 is disposed in connection with the socket 29 and leads 33 for providing circuit connection or communication therebetween when the lens 42 is displaced to its operative position. Hence, the switch 63 broadly provides means for electrically coupling the source of illumination with the conductor means responsive to displacement of the directing means to its operative position.

In the illustrated embodiment, switch arm 65 is held in a depressed state (and switch 63 held open) so long as the lens assembly 42 is in its stored position. Consequently, the switch 63 is open circuited and thereby precludes energization of the source 30 at this time. Of course, other means for electrically interlocking the lens 42 with the input circuit are also suitable. For example, the switch 63 may be a "normally-open" switch, positioned at the forward lower edge of the support base 24 such that its actuator arm 63 may be displaced and the circuit completed only when the lens assembly 42 is in its erect, operative position. Alternatively, the lens assembly 42 and the support base 24 may carry complementary interlock means, for example, the lens 42 may carry a conventional conductive strip interlock (not shown) at the lower edge of the lens, which is in engagement with spaced contact portions (not shown) of leads 33, when the lens is in its operative position, and is automatically displaced out of such engagement (so as to interrupt the circuit) when the lens is removed from its operative location.

In this embodiment lens assembly 42 is mounted to the forward edge of the platform 26 such that a portion of the lens element lies below the plane of the platform. Consequently, in order to provide full illumination of the lens assembly, the platform 26 extends in a bifurcated arrangement 66 to support the lens assembly, and results in a particularly compact structure wherein the lens assembly still receives the full cone of light directed from mirror 40.

Advantageously, the lighting unit 12 is removably affixed to the camera by a means of a mounting lug 50 or the like and may be folded into its storage position while affixed to the camera. Additionally, the lighting unit may be easily removed from the camera and conveniently stored in its folded arrangement. Further, the lighting unit is mounted to the camera in such a manner that the relatively large planar lens assembly 42 is folded not only into parallel arrangement with platform 26 but also in substantially parallel relation to the top surface 72 of the camera 10. Consequently, the foldable arrangement of the lighting unit cooperates with its associated camera to provide a particularly compact photographic motion picture system.

Those familiar with the photographic arts will readily appreciate the novel and highly unique advantages of this invention which provides a foldable lighting unit adapted for mounting on a motion picture camera. The lighting unit provides a convenient, highly efficient luminaire of a large exit aperture which is foldable to a particularly compact storage arrangement, and additionally, provides an electrical interlock adapted to preclude operation of the unit when it is in its stored state.

This invention may be practiced or embodied in still other ways without departing from the spirit and essential character thereof. The preferred embodiment described herein is therefore illustrative and not restrictive, the scope of the invention being indicated by the appended claims and all variations which come within the meaning of the claims are intended to be embraced therein.

What is claimed is:

1. A foldable lighting unit for use with a photographic camera for illuminating a scene to record an image thereof on photosensitive material carried within said camera, said lighting unit comprising:
 a support member including means for receiving source of illumination in close proximity to said member and at a fixed location such that at least a portion of such illumination is directed upwardly from said support member along a first optical path;
 reflector means for redirecting such illumination from said first optical path forwardly towards such scene along a second optical path spaced from said support member, said reflector means including a reflector element displaceably coupled to said support member for movement between an operative position, wherein such reflector element is inclined over such source and in operative relation to the illumination directed along said first path, and a storage position, wherein said reflector is disposed in close proximity to and overlying relation to said support member; and
 lens means for dispersing to such scene the illumination directed along said second optical path, said lens means being displaceably coupled to said support member and configured for pivotal movement around an axis generally normal to said first and second paths between an operative position forwardly of such source, wherein said lens means is substantially normal to said second optical path, and a storage position, wherein said lens means is disposed in close proximity to and overlying relation to said support member and to such source when the latter is received in its said fixed location.

2. The unit of claim 1 wherein said lens means includes a lens assembly pivotally coupled to said support member for movement between an operative position wherein said lens assembly is substantially parallel with said first optical path and a storage position wherein said lens assembly is substantially normal to said first optical path.

3. The unit of claim 2 wherein said first path is substantially normal to said support member, and said second path is substantially parallel to said support member.

4. The unit of claim 1 wherein said lens means is coupled to said support member for displacement between its said operative position and a storage position wherein it is in overlying relation to such source and said reflector element when the latter is in its said storage position.

5. The unit of claim 1 wherein said support member includes a support surface, said receiving means including means configured to receive such source such that a portion thereof extends slightly above said surface, said reflector element is a planar element coupled to said surface for movement between its said inclined position and its said storage position wherein it is located generally forwardly of said source and in overlying relation to said surface, and said lens means is a planar lens assembly coupled to said surface for movement between an operative position wherein it is substantially upright with respect to said surface and a storage position wherein it overlies such source and said reflector element when the latter is in its said storage position.

6. The unit of claim 1 wherein said receiving means includes means for receiving at said fixed location both a source of illumination and a curved reflector configured for directing a major portion of the illumination from such source along said first optical path.

7. The unit of claim 6 wherein said support member includes a surface having an opening therein which is configured to receive such source, said lens means includes a lens element of comparatively large area as compared to such source, and said lens element being pivotally coupled to said support member and configured for displacement between a generally operative position substantially normal to said surface and a storage position overlying said surface and such source when the latter is received in said opening.

8. The unit of claim 6 wherein said lens means includes a lens assembly having a collimating lens and a lenticular lens in closely spaced relation, and said lens assembly being pivotally coupled to said support member for movement between its said operative position and its said storage position.

9. The unit of claim 1 wherein said receiving means includes means for receiving such source so that a portion thereof extends above said support member, and said reflector element is a planar element displaceably coupled to said support member for movement between its said operative position, wherein it is inclined over such source, and a storage position, wherein it is located generally forwardly of such source and in overlying relation to said support member.

10. The unit of claim 9 wherein said reflector element includes an opening therein at the rearward edge thereof configured to receive such upwardly extending portion of such source when said reflector element is displaced to its said storage position.

11. The unit of claim 9 wherein said planar reflector element is coupled to said support member so as to permit both pivotal motion of said reflector element downwardly from its inclined operative position and displacement forwardly of said source location so as to permit said reflector element to closely overlie said support member.

12. The unit of claim 11 wherein said reflector element is coupled to said support member by foldable struts configured for providing said downward and forward motion of said reflector element when it is displaced between said operative and said storage positions.

13. The unit of claim 1 wherein said support member includes switch means for selectively conducting electrical power between a source thereof and said receiving means responsive to the relative positions of said reflector means and said lens means so as to effect electrical communication between said receiving means and such power source when said lens assembly is in its said operative position and for precluding said electrical communication when said lens means is in its said storage position, said switch means including a normally closed switch configured for contact with said lens means and actuation to an open circuit condition when said lens means is disposed in its said storage position.

14. A lighting unit for use with a photographic camera for illuminating a scene to record an image thereof on photosensitive material carried within such camera, said lighting unit comprising:

first means for mounting a source of illumination, said first means including a support structure having a platform-like surface configured for receiving such source at a given location thereon, said platform-like surface having a bifurcated leading edge;

second means for directing the illumination from such source when so mounted to such scene, said second means including a lens element; and third means for arranging said first and second means relative to one another between a first position wherein said first and second means are spaced in operative optical relation to one another, and a second position wherein said first and second means are disposed in close proximity to each other for storage of said unit, said third means including means coupling said lens element to said support structure for movement between a first position, wherein said lens element is spaced from said given location, and a second position, wherein said lens element is disposed in close proximity to said given location, said lens element being coupled to said bifurcated edge such that a portion of said lens element is below the plane of said platform when said lens element is in said first position.

15. A lighting unit for use with photographic camera for illuminating a scene to record an image thereof on photosensitive material carried on such camera, said lighting unit comprising:

first means for mounting a source of illumination, said first means including a support structure having a platform-like surface configured for receiving such source such that a portion thereof extends slightly above said surface and at a given location thereon so as to direct illumination from such source along a first optical path approximately normal to said surface;

second means for redirecting such illumination from said first optical path forwardly towards such scene along a second path spaced from and approximately parallel to said surface, said second means including a reflector displaceably coupled to support member for movement between an operative position, wherein such reflector is inclined over such source and in operative relation to the illumination directed along said first path, and a storage position, wherein said reflector is disposed in close proximity to and in an overlying relation to said support member, said reflector including an opening configured to receive the extended portion of such source when said reflective element is disposed in its said storage position; and third means for dispersing to such scene the illumination directed along said second optical path, said third means including a lens element pivotally mounted on said platform-like surface for movement between a first position, wherein said lens element is spaced from said given location and the optical axis of said lens element is aligned with said second optical path, and a second position wherein said lens element is disposed in close proximity to and overlying relation to said given location and said surface.

16. The unit of claim 15 wherein said reflector element is bifurcated at its trailing edge so as to provide said opening.

* * * * *